(12) United States Patent
Kim et al.

(10) Patent No.: US 9,224,521 B2
(45) Date of Patent: Dec. 29, 2015

(54) HALOGEN-FREE POLYMER RESIN COMPOSITION AND POLYMER RESIN MATERIAL MADE BY USING SAID COMPOSITION

(71) Applicant: NEXANS, Paris (FR)

(72) Inventors: Seong-Jin Kim, Chungcheongbuk-do (KR); Young-Gu Kim, Chungcheongbuk-do (KR); Oh-Hyun Choi, Chungcheongnam-do (KR)

(73) Assignee: NEXANS, Paris (FR)

( * ) Notice: Subject to any disclaimer, the term of this patent is extended or adjusted under 35 U.S.C. 154(b) by 11 days.

(21) Appl. No.: 13/693,589

(22) Filed: Dec. 4, 2012

(65) Prior Publication Data

US 2013/0338258 A1    Dec. 19, 2013

(30) Foreign Application Priority Data

Dec. 29, 2011    (KR) .................... 10-2011-0145965

(51) Int. Cl.

| | | |
|---|---|---|
| *C08L 31/04* | (2006.01) | |
| *C08L 51/06* | (2006.01) | |
| *C08L 75/08* | (2006.01) | |
| *C08K 3/22* | (2006.01) | |
| *H01B 3/44* | (2006.01) | |
| *H01B 7/295* | (2006.01) | |
| *H01B 3/30* | (2006.01) | |

(52) U.S. Cl.
CPC ............... *H01B 3/448* (2013.01); *H01B 3/302* (2013.01); *H01B 3/308* (2013.01); *H01B 7/295* (2013.01); *C08K 2003/2224* (2013.01); *C08K 2003/2227* (2013.01); *C08K 2201/014* (2013.01)

(58) Field of Classification Search
None
See application file for complete search history.

(56) References Cited

U.S. PATENT DOCUMENTS

| | | | | |
|---|---|---|---|---|
| 3,308,086 | A * | 3/1967 | Wartman ..................... | 524/145 |
| 7,759,580 | B2 * | 7/2010 | Park et al. ................. | 174/121 A |
| 2009/0255707 | A1 * | 10/2009 | Moriuchi et al. ....... | 174/110 SR |

FOREIGN PATENT DOCUMENTS

JP    2004051903 A  *  2/2004

OTHER PUBLICATIONS

Machine Translation of JP2004-051903A. Feb. 19, 2004.*
Irganox 1010 Information. BASF Chemical. Sep. 2010.*

* cited by examiner

*Primary Examiner* — Robert C Boyle
*Assistant Examiner* — Stephen Rieth
(74) *Attorney, Agent, or Firm* — Sofer & Haroun, LLP

(57) ABSTRACT

The present arrangement is directed to a polymer resin composition having polyvinyl acetate resin having 60 to 80% by weight of vinyl acetate group as a base resin. The composition has the following components based on 100 parts by weight of the base resin: 10 to 15 parts by weight of ethylene resin having a polar group or its copolymer resin; 29 to 40 parts by weight of ether-type polyurethane resin; 140 to 171 parts by weight of aluminum hydrate; 15 to 55 parts by weight of magnesium hydrate and flame retardant aid; 3 to 5 parts by weight of antioxidant; 10 to 15 parts by weight of plasticizer; and 4 to 0.5 parts by weight of crosslinking agent.

7 Claims, No Drawings

HALOGEN-FREE POLYMER RESIN COMPOSITION AND POLYMER RESIN MATERIAL MADE BY USING SAID COMPOSITION

RELATED APPLICATION

This application claims the benefit of priority from Korean Patent Application No. 10-2011-0145965, filed on Dec. 29, 2012, the entirety of which is incorporated by reference.

BACKGROUND

1. Field of the Invention

The present invention related to a halogen-free polymer resin composition and a polymer resin material made from the composition, particularly a cable for ships or drillships. The polymer resin material made from the composition according to the present invention maintains its flexibility even at a low temperature of −40° C. It has not only flame retardancy that satisfies the requirements for use in a cable for general ships, but also oil resistance that satisfies the requirements for use in marine structures such as oil well drilling ships, oil well drilling structures or drillships.

2. Description of Related Art

In recent years, the use of a halogen such as bromine or chlorine has been partially limited in many countries. This is because halogen-containing compounds have been reported to generate environmental hormones, which result in carcinogenesis, skin diseases, a decrease in immunity, a delivery of deformed babies and a toxicity to the human body. In addition, halogens can cause chemical reactions by water and heat, resulting in highly toxic products. Particularly, when a fire breaks out in, for example, ships provided with halogen-containing cables, the risk of human casualties will further increase due to harmful gases. Therefore, the NGO Greenpeace and the like are offering environment-friendly guides that recommend no use of halogen-containing products, and many companies have also developed halogen-free products.

Moreover, cables for use in marine structures such as oil well drilling ships, oil well drilling structures or drillships are required to have more excellent oil resistances compared to cables for use in general ships, and need to maintain their flexibility even at low temperatures such as −40° C. In connection with this, it is very difficult for a cable sheath material having flexibility at a low temperature of −40° C. to satisfy both the oil resistance requirement of IEC 60092-359 and the oil resistance requirement of the NEK 606. This is because IRM 903 oil used in NEK 606 has higher aromatic hydrocarbon content than IRM 902 oil used in IEC 60092-359, and ethylene vinyl acetate contained in cables has poor resistance to the aromatic hydrocarbons. For this reason, stronger oil resistances are required under the conditions using IRM 903 oil. Furthermore, cables for use in oil well drilling ships or drillships are used in more severe environment than cables for general ships, and this it should satisfy more strict requirements.

OBJECTS AND SUMMARY OF THE INVENTION

According to the global tendency toward environment-friendly products, there is a need to prepare a cable or an electric wire which does not contain a halogen having adverse effects, for example emission of substances harmful to the human body upon combustion. In addition, there is a need to a cable or an electric wire which maintains its flexibility even at low temperatures such as −40° C., and at the same time satisfies a high oil resistance for use in oil well drilling ships or drillships and also has an excellent flame retardancy.

Therefore, the present inventors have recognized the above-described problems occurring in the prior art and conducted studies to solve the problems. As a result, the present inventors have developed a polymer resin composition comprising an ether-type polyurethane resin without containing a halogen.

The polymer resin composition according to the present invention comprises, as a base resin, a polyvinyl acetate resin containing 60-80 wt % of vinyl acetate functional group, the composition comprising, based on 100 parts by weight of the base resin, 10-15 parts by weight of an ethylene resin having a polar group or its copolymer resin, 30-40 parts by weight of an ether-type polyurethane resin, 140-170 parts by weight of aluminum hydrate, 15-55 parts by weight of magnesium hydrate and a flame retardant aid, 3-5 parts by weight of an antioxidant, 10-15 parts by weight of a plasticizer, and 4-5 parts by weight of a crosslinking agent.

The base resin used in the polymer resin composition according to the present invention is a polyvinyl acetate resin containing 60-80 wt % of vinyl acetate functional group. Ethylene vinyl acetate (EVA) resin contains no halogen, and it is believed that vinyl acetate (VA) in the ethylene vinyl acetate performs the function of halogen. The physical properties of the EVA are determined according to the content of the VA. As the content of the VA increases, the oil resistance and flame retardancy of the EVA are improved, but the mechanical properties and low-temperature flexibility of the EVA are deteriorated and the cold resistance decreases. On the other hand, as the content of the VA decreases, the mechanical properties and low-temperature flexibility of the EVA are maintained, but the oil resistance and flame retardancy of the EVA are deteriorated. Accordingly, in the present invention, the EVA has a VA content of 60-80 wt % in order to obtain an optimal compromise in terms of oil resistance, flame retardancy, mechanical properties and low-temperature flexibility, which are required in cables, particularly cables for ships.

The polymer resin composition according to the present invention comprises an ethylene having a polar group of its copolymer in an amount of 10-15 parts by weight based on 100 parts by weight of the base resin. Examples of the ethylene resin having a polar group of its copolymer include, but are not limited to, maleic anhydride-grafted ethylene butyl acrylate, and maleic anhydride-grafted ethylene vinyl acetate. A person skilled in the art can select a suitable ethylene resin or its copolymer from compounds known to be included therein. If the content of the ethylene resin having a polar group of its copolymer resin is less than 10 parts by weight based on 100 parts by weight of the base resin, the tensile strength of the cable made from the composition decreases. If said content is more than 15 parts by weight, the cold resistance and oil resistance of the cable decreases. Thus, when the ethylene resin having a polar group or its copolymer resin is contained in an amount of 10-15 parts by weight based on 100 parts by weight of the base resin as disclosed in the present invention, it functions to improve the low-temperature impact properties of the cable while reinforcing mechanical properties.

The polymer resin composition according to the present invention comprises an ether-type polyurethane resin in an amount of 30-40 parts by weight based on 100 parts by weight of the base resin. Polyurethane resins are generally divided into ester-type polyurethane resin and ether-type polyurethane resin. The ester-type polyurethane resin is excellent in terms of mechanical properties, abrasion resistance, cold resistance and oil resistance compared to the ether-type polyurethane resin. On the other hand, the ether-type polyurethane resin is excellent in terms of chemical resistance, water resistance, cold resistance, rebound resilience and dynamic fatigue properties compared to the ester-type polyurethane resin. Thus, the ether-type polyurethane resin is contained in the composition of the present invention in order to maintain oil resistance while at the same time ensuring flexibility at a low temperature of −40° C.

The polymer resin composition according to the present invention comprises, based on 100 parts by weight of the base resin, 140-170 parts by weight of aluminum hydrate and 15-55 parts by weight of magnesium hydrate and other flame retardant aids. Examples of the halogen-free flame retardants used in the present invention include aluminum hydrate, such as aluminum trihydroxide or aluminum hydroxide, and magnesium hydrate such as magnesium dihydroxide or magnesium hydroxide. Examples of the flame retardant aid used in the present invention include, but are not limited to, those generally known in the art, for example zinc boride. If the content of the aluminum hydrate is less than 140 parts by weight based on 100 parts by weight of the base resin, the flame retardancy of a cable manufactured from the composition decreases. If said content is more than 170 parts by weight, it is observed that the elongation of the cable decreases. In addition, it is observed that if the content of the magnesium hydrate and the flame retardant aids is less than 15 parts by weight based on 100 parts by weight of the base resin, the flame retardancy of a cable manufactured from the composition decreases, whereas if it is more than 55 parts by weight, the tensile strength of the cable decreases.

The polymer resin composition according to the present invention comprises an antioxidant in an amount of 3-5 parts by weight based on 100 parts by weight of the base resin. Examples of the antioxidant used in the present invention include, but are not limited to, phenolic antioxidants, diphenylamine derivatives and the like.

The polymer resin composition according to the present invention comprises a plasticizer in an amount of 10-15 parts by weight based on 100 parts by weight of the base resin. Examples of the plasticizer used in the present invention include dioctyl sebacate (DOS) or trioctyl phosphate (TOF). As the content of the plasticizer increases, the flame retardancy of the cable decreases. Thus, a phosphorus-based plasticizer may be used as a plasticizer for imparting flame retardant properties to the composition.

The polymer resin composition according to the present invention comprises a crosslinking agent in an amount of 4-5 parts by weight based on 100 parts by weight of the base resin. The crosslinking agents used in cables in the art generally include sulfur-based crosslinking agents and peroxide-based crosslinking agents, but the present invention uses the peroxide-based crosslinking agent (e.g., dialkyl peroxide) which can exhibit more excellent heat resistance and oil resistance compared to the sulfur-based crosslinking agent. When this crosslinking agent is used, a network-type polymer structure can be formed by chemical bonding between polymer chains in a process of manufacturing rubbery products such as cables, thereby obtaining desired heat resistance, oil resistance and mechanical properties.

Advantageous Effects

A polymer resin material made from a polymer resin composition according to the present invention contains no halogen, and does not emit a toxic substance harmful to the human body even when it is burned in a fire in ships, etc. Moreover, it satisfies the flame retardancy requirements of cables for general ships, and maintains its flexibility even at a low temperature of −40° C. And at the same time, it satisfies not only IEC 60092-359 oil resistance requirements of cables for general ships, but also NEK 606 oil resistance requirements of marine structures such as oil well drilling ships, oil well drilling structures or drillships.

Thus, the polymer resin material according to the present invention can be used in cables or electric wires. In particular, the polymer resin material can also be used in cables or electric wires which are placed in the extreme conditions such as marine structures such as oil well drilling ships, oil well drilling structures or drillships.

DETAILED DESCRIPTION

Examples

The present invention is described in further detail in the following Examples which are not in any way intended to limit the scope of the invention as claimed. In addition, it will appear to a person skilled in the art that various modifications may be made to the disclosed embodiments, and that such modifications are intended to be within the scope of the present invention.

Specimens were prepared according to the components and contents of the polymer resin compositions described in Table 1 below, and the contents in Table 1 are expressed as parts by weight.

TABLE 1

|  | Examples | | Comparative Examples | |
| --- | --- | --- | --- | --- |
|  | 1 | 2 | 3 | 4 |
| Ethylene vinyl acetate (60 or 70%) | 100 | 100 | 100 | 100 |
| Ethylene vinyl acetate (26%) | 7 | 7 | 25 | 17 |
| Thermoplastic polyurethane | 29 | 29 | 42 | 42 |
| Maleic anhydride-grafted ethylene butyl acrylate | 14 |  |  |  |
| Maleic anhydride-grafted ethylene vinyl acetate |  | 14 | 17 | 17 |
| TAC (triallyl cyanurate) | 1 | 1 | 2 | 2 |
| Phenolic antioxidant | 3 | 3 | 3 | 3 |
| Aluminum trihydroxide | 171 | 171 | 167 | 167 |
| Magnesium dihydroxide | 14 | 14 | 67 | 67 |
| Zinc boride | 14 | 14 |  |  |
| Processing aid (fatty acid derivative) | 4 | 4 | 5 | 5 |
| Dioctyl sebacate | 10 | 14 | 12 | 12 |
| PBP-98 | 5 | 5 | 5 | 5 |

PBP-98 described in Table 1 has a product name of Perbutyl P and a chemical name of bis(t-butylperoxyisopropyl) benzene, and belongs to peroxide-based crosslinking agents.

A. Mechanical Properties

A sheath was removed from a cable manufactured from each of the compositions described in Table 1, and then the mechanical properties of the cable were evaluated in accordance with IEC 60811-1-1. When a tensile test is performed in accordance with IEC 60811-1-1, the cable should satisfy a tensile strength of 0.92 kgf/mm² or more and an elongation of 120% or more.

B. Oil Resistance Test

A cable to which the composition of the present invention is applied has a standard of NEK 606 (cables for offshore installations halogen-free and/or mud resistant) which is required for use in marine structures such as oil well drilling ships, oil well drilling ships or drillships.

A cable for use in general ships and a cable for use in oil well drilling ships or drillships are used under the fundamentally different environments, and thus require different standards. More specifically, the two types of cable differ in terms of chemical resistance, and the cable for drillships is required to have resistance to drilling fluid (IRM 902, Carbosea, calcium bromide brine) in addition to the requirements of the cable for general ships. Table 2 below summarizes the standards of a cable for drillships in comparison with the standards of a cable for general ships.

TABLE 2

| | IEC 60092-359 (cable for general ships) | NEK 606 (cable for drillships) |
|---|---|---|
| IRM 902 oil resistance | After immersion at 100° C. for 24 hours, Change in tensile strength; ±40% Change in elongation: ±40% | The same as the left side |
| IRM 903 oil resistance | None | After immersion at 100° C. for 168 hours, Change in tensile strength: ±30% Change in elongation: ±30% Change in weight: 30% or less Change in volume: 30% or less |
| Oil based drilling fluid (Carboses) | None | After immersion at 70° C. for 56 days, Change in tensile strength: ±30% Change in elongation: ±30% Change in weight: 30% or less Change in volume: 30% or less |
| Water based drilling fluid (Calcium bromide brine) | None | After immersion at 70° C. for 56 days, Change in tensile strength: ±25% Change in elongation: ±25% Change in weight: 15% or less Change in volume: 20% or less |

The oil resistance of cables for general ships is generally tested using an IRM 902 oil test. On the other hand, a cable such as NEK 606 which is used in extreme conditions such as oil well drilling ships or drillships is required to be tested using an IRM 903 oil test. In connection with this, IRM 903 oil contains a larger amount of aromatic hydrocarbons compared to IRM 902 oil, and ethylene vinyl acetate has poor resistance to the aromatic hydrocarbons. For this reason, the IRM 903 oil test requires more excellent oil resistance compared to the IRM 902 oil test. Generally, a cable sheath material showing flexibility at a low temperature of −40° C. satisfies the oil resistance property of IEC 60092-359 using IRM 902 oil, but it is very difficult to satisfy the oil resistance property of NEK 606 using IRM 903 oil, simultaneously.

In this test, the change (%) in volume and the change (%) in weight were measured in accordance with ASTM D471, and oil resistance was evaluated based on the results of the measurement.

C. Flame Retardancy Test

A specimen was taken from a cable manufactured from each of the compositions described in Table 1, and was subjected to a flame retardancy test in accordance with IEC 60332-3 Cat. A. More specifically, the flame retardancy of the material was measured in accordance with ASTM D 2863, and the oxygen index should be 30% or more. The flame retardancy test was performed in accordance with the flame retardancy test standards of IEC 332-2 Cat. A.

D. Cold Resistance Test

A specimen was taken from a cable manufactured from each of the compositions described in Table 1, and was subjected to a cold resistance test in accordance with CSA C 22.2 No. 3. When a cable for ships is required to have cold resistance, a cold impact test at −35° C. and a cold bending test at −40° C. are generally performed. The cold impact test was performed at −35° C. in accordance with the test standards of CAS C 22.2 No. 3. The cold bending test was performed at −40° C. in accordance with the test standards of CAS C 22.2 No. 3.

A cable manufactured from each of the compositions shown in Table 1 was evaluated for mechanical properties at room temperature, oil resistance, flame retardancy and cold resistance, and the results of the evaluation are shown in Table 3 below.

TABLE 3

| | | Examples | | Comparative Examples | |
|---|---|---|---|---|---|
| | | 1 | 2 | 3 | 4 |
| Mechanical properties at room temperature | Tensile strength (kgf/mm²) | 1.06 | 1.04 | 1.20 | 1.15 |
| | Elongation (%) | 171 | 213 | 192 | 162 |
| Oil resistance | Change (%) in volume | 27 | 27 | 37 | 32 |
| | Change (%) in weight | 17 | 18 | 23 | 19 |
| Flame retardancy | Oxygen index (%) | 33 | | | |
| | IEC 332-3 Cat. A | Pass | | | |
| Cold resistance | Cold impact | Pass | Pass | Pass | Fail |
| | Cold bending | Pass | Pass | Pass | Fail |

As can be seen in Table 3, all cables of Examples 1 and 2 and Comparative Examples 3 and 4 showed excellent tensile strength and elongation at room temperature. However, the cables of Comparative Examples 3 and 4 showed a change in volume of more than 30% in the oil resistance test. The cable of Comparative Example 3 showed a change in weight of more than 20% in the oil resistance test. In addition, the cables of Comparative Example 4 was failed in both the cold impact test and the cold bending test, which are related to cold resistance.

On the other hand, the cables of Examples 1 and 2 showed a change in volume of less than 30% and a change in weight of less than 20% in the oil resistance test, and at the same time were passed in all of the flame retardancy test and the cold resistance-related cold impact test and cold bending test.

In particular, NEK 606 cables are required to have resistance to two types of drillship mud oil. It was demonstrated that the cables of Examples 1 and 2 according to the present invention satisfy such requirements. Table 4 below snows the results of resistance tests using the cable of Example 1.

TABLE 4

| IRM 902 oil resistance | After immersion at 100° C. for 24 hours, Change in tensile strength: +2% Change in elongation: +20% |
|---|---|

TABLE 4-continued

| | |
|---|---|
| IRM 903 oil resistance | After immersion at 100° C. for 168 hours,<br>Change in tensile strength: +19%<br>Change in elongation: −14%<br>Change in weight: +17%<br>Change in volume: +28% |
| Oil based drilling fluid (Carboses) | After immersion at 70° C. for 56 days,<br>Change in tensile strength: −3%<br>Change in elongation: +25%<br>Change in weight: +5%<br>Change in volume: +10% |
| Water based drilling fluid (Calcium bromide brine) | After immersion at 78° C. for 56 days,<br>Change in tensile strength: +5%<br>Change in elongation: −6%<br>Change in weight: −1%<br>Change in volume: −2.5% |

The invention claimed is:

1. A cable sheath made from a polymer resin composition said polymer resin composition comprising:
   polyvinyl acetate resin having 60 to 80% by weight of vinyl acetate group as a base resin, wherein the composition has the following components based on 100 parts by weight of the base resin:
   10 to 15 parts by weight of ethylene butyl acrylate grafted with maleic anhydride;
   29 to 40 parts by weight of ether-type polyurethane resin;
   140 to 171 parts by weight of aluminum hydrate;
   15 to 55 parts by weight of magnesium hydrate and flame retardant aid;
   3 to 5 parts by weight of antioxidant;
   10 to 15 parts by weight of plasticizer; and
   4 to 5 parts by weight of crosslinking agent,
   wherein said polymer resin composition when applied as said cable sheath on a cable or electric wire maintains flexibility at a low temperature of −40° C. passing the CSA C 22.2 No. 3 cold resistance-cold bending test.

2. The cable sheath made from a polymer resin composition according to claim 1, wherein the aluminum hydrate is either one of aluminum trihydroxide or aluminum hydroxide, the magnesium hydrate is either one of magnesium dihydroxide or magnesium hydroxide, and the flame retardant aid is zinc borate.

3. The cable sheath made from a polymer resin composition according to claim 1, wherein the antioxidant is a phenol-based antioxidant, the plasticizer is either one of dioctyl sebacate or phosphorus-based plasticizer, and the crosslinking agent is a peroxide-based crosslinking agent.

4. The cable sheath made from a polymer resin composition according to claim 1, wherein said cable or electric wire satisfies IEC 60092359 oil resistance requirements of cables for general ships.

5. The cable sheath made from a polymer resin composition according to claim 1, wherein said cable or electric wire satisfies NEK 606 oil resistance requirements of marine structures.

6. A cable or electric wire manufactured using the cable sheath made from a polymer resin composition according to claim 1.

7. A cable or electric wire according to claim 6, wherein said cable or electric wire is a cable for ship or for marine structure.

* * * * *